Sept. 2, 1924.  
S. EVANS  
1,507,234  
FRICTION BEARING FOR WIND AND RAIN SHIELDS AND OTHER DEVICES  
Filed Jan. 26, 1923
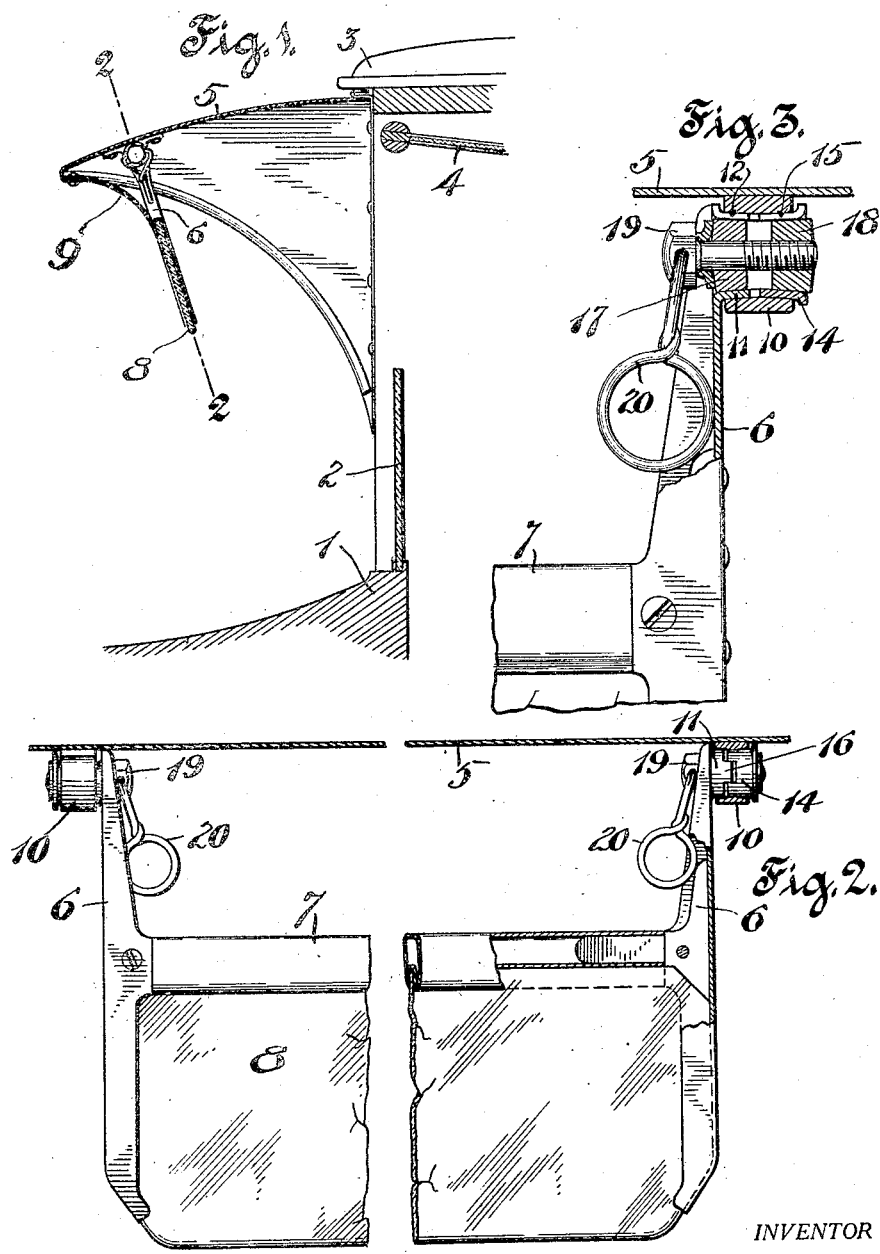
INVENTOR  
Sanford Evans  
BY  
Mitchell Brothers  
ATTORNEYS.

Patented Sept. 2, 1924.

1,507,234

UNITED STATES PATENT OFFICE.

SANFORD EVANS, OF WESTPORT, CONNECTICUT, ASSIGNOR TO GEORGE F. MILES, OF NEW YORK, N. Y.

FRICTION BEARING FOR WIND AND RAIN SHIELDS AND OTHER DEVICES.

Application filed January 26, 1923. Serial No. 615,035.

*To all whom it may concern:*

Be it known that I, SANFORD EVANS, a citizen of the United States of America, residing at Westport, Connecticut, have invented new and useful Improvements in Friction Bearings for Wind and Rain Shields and Other Devices, of which the following is a specification.

My invention relates to certain new and useful improvements in wind or rain shields such as used on automobiles and other vehicles, and it consists in various improvements including simple and effective means whereby an angularly adjustable windshield section may be firmly secured in any desired angular position.

In the drawings:

Fig. 1 is a side elevation partly in section, and a portion of a vehicle showing my invention applied thereto.

Fig. 2 is a relatively enlarged front view, also in section, and partially broken away at the center.

Fig. 3 is a detail view, partly in section and on a still larger scale, illustrating more particularly the adjusting means.

1 represents the so-called cowl or front portion of a carriage body. 2 is the usual transparent lower section of a windshield mounted thereon. 3 represents the roof or top of the carriage body. 4 conventionally represents the upper section of the windshield which is ordinarily pivoted to swing so as to cooperate with the lower section and close the front. 5 represents a hood or shade which extends well forwardly of the section 4. Pivotally mounted on the under side of the shade 5 is a frame which comprises two side arms 6—6 which are connected intermediate their ends by a crossbar 7. Below the cross-bar is a transparent sheet of glass or the like, indicated at 8, spanning the space between the side arms. Above the cross-bar 7 is a flexible deflector element 9, the upper edge of which may be secured to the under side of the shade 5 forward of the pivotal connection for the aforesaid frame. The deflector element 9 preferably bears against the forward side of the frame at or near the cross-bar 7 so as to act as a means to prevent air, rain or snow from driving through the space above said cross-bar no matter in what position of angular adjustment the frame may be placed.

The means for adjustably securing the frame at any desired angle will now be described. As shown, a similar adjusting means is used at the upper end of each side bar 6; therefore a description of one will suffice for both. Refering to Fig. 3, it will be seen that, secured to the under side of the shade 5 is a ring 10, the bore through which is tapered or flared outwardly at each end. The element 6 is preferably made from sheet metal, and the upper end thereof is stamped out so as to provide a sleeve-like extension 11 which projects into one end of the ring 10. The upper end of this sleeve-like extension is slit, as at 12, so that said sleeve may be expanded and forced tightly against the inside of the ring 10. 14 is a sleeve-like element slit at 15 and arranged to project into the opposite end of the ring 10. The adjacent inner ends of the sleeves 11—14 are so shaped as to provide a recess in one part and a dog on the other part, the dog being indicated at 16 (Fig. 2), wherein it is shown as projecting partially into said recess. This provides a simple means to prevent these two parts 11—14 from turning independently. 17 and 18 are two tapered plug-like elements, the former extending into the sleeve 11 and the latter extending into the sleeve 14. 19 is a screw bolt, which passes freely through the wedge element 17 and screws into the wedge element 18. 20 represents conventionallly one form of an operating lever or handle that may be carried by the head of the screw 19, whereby the latter may be easily turned.

While I have shown my new friction joint as associated with a windshield, it is obvious that said joint may be employed in connection with any two pivotally connected parts between which it is desirable to have means for frictionally holding said parts in different angular adjustments.

*Operation.*—From the foregoing it is apparent that, when the two wedge-like elements 17—18 are drawn toward each other, they will operate to expand the sleeves 11—14 respectively, so as to crowd the same tightly against the inside of the ring 10. I have found that even though these parts may be of comparatively small dimensions, the frictional pressure is such that the deflector frame will be adequately held at any desired angle against heavy wind pressure. It is apparent that this structure may be very cheaply produced and may be easily and quickly assembled.

What I claim is:

1. In a device of the character described, a support, a movable member, a pivotal connection between said support and said member comprising a ring-like bearing on one of said parts, a sleeve on the other part entering one end of the bore of said bearing, another sleeve entering the other end of the bore of said bearing, and two co-acting wedges operable to expand said sleeves when drawn toward each other, and a single manually operable means to draw said wedges toward each other.

2. In a device of the character described, a support, a movable member, a pivotal connection between said support and said movable member comprising a ring-like bearing on one of said parts, a sleeve on the other part entering one end of the bore of said bearing, another sleeve entering the other end of the bore of said bearing, and an adjustable wedging means operable to expand said sleeves, with means to prevent said sleeves from turning independently of each other.

3. In a device of the character described, a support, a movable member, a pivotal connection between said support and said movable member comprising a ring-like bearing on one of said parts, a sleeve on the other part entering one end of the bore of said bearing, another sleeve entering the other end of the bore of said bearing, an adjustable wedging means operable to expand said sleeves, with means to prevent said sleeves from turning independently of each other, comprising inter-engaging means on the adjacent ends of said sleeves.

4. In a device of the character described, a support, a movable member, a pivotal connection between said support and said movable member, comprising a ring-like bearing on one of said parts, a sleeve on the other part entering one end of the bore of said bearing, another sleeve entering the other end of the bore of said bearing, and an adjustable wedging means operable to expand said sleeves, said wedging means comprising two plugs and screw connection between the same, said screw connection comprising a headed screw passing freely through one of said plugs and being threaded into the other.

5. In a windshield of the character described, a frame comprising two side arms, a cross bar connecting said arms intermediate the length of each, a transparent plate between said side arms and below said cross bar, a pivotal support for said frame, comprising a connection adjacent the end of each side arm, one of said connections comprising a laterally-projecting sleeve on said arm, a supporting ring-like bearing surrounding said sleeve, and a wedging means passing through said bearing and sleeve and movable axially to expand the latter within the former to frictionally hold said frame at different positions of angular adjustment.

6. In a windshield of the character described, a frame comprising two side arms, a transparent plate between said side arms, a pivotal support for said frame, comprising a connection adjacent the end of each side arm, one of said connections comprising a laterally-projecting sleeve on said arm, a supporting ring-like bearing surrounding said sleeve, and a wedging means passing through said bearing and sleeve and movable axially to expand the latter within the former to frictionally hold said frame at different positions of angular adjustment, said wedging means, including two oppositely positioned tapered wedging elements and means for drawing them toward each other.

SANFORD EVANS.